United States Patent
Shinkawa

(10) Patent No.: US 8,289,585 B2
(45) Date of Patent: *Oct. 16, 2012

(54) IMAGE SCANNING DEVICE AND IMAGE FORMING APPARATUS INCLUDING THE SAME

(75) Inventor: Shohei Shinkawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 677 days.

This patent is subject to a terminal disclaimer.

(21) Appl. No.: 12/453,374

(22) Filed: May 8, 2009

(65) Prior Publication Data

US 2009/0323135 A1 Dec. 31, 2009

(30) Foreign Application Priority Data

Jun. 26, 2008 (JP) .................................. 2008-167549
Jan. 19, 2009 (JP) .................................. 2009-009110

(51) Int. Cl.
*H04N 1/04* (2006.01)
(52) U.S. Cl. ........ 358/474; 358/497; 358/486; 399/379; 399/371
(58) Field of Classification Search .................. 358/474, 358/497, 496, 486, 449, 498; 399/370, 371, 399/379, 380
See application file for complete search history.

(56) References Cited

U.S. PATENT DOCUMENTS

| | | | | |
|---|---|---|---|---|
| 4,882,619 A | * | 11/1989 | Hasegawa et al. | 348/337 |
| 5,198,909 A | * | 3/1993 | Ogiwara et al. | 358/412 |
| 5,500,725 A | * | 3/1996 | Takasu et al. | 399/17 |
| 5,778,270 A | * | 7/1998 | Morisawa | 396/429 |
| 5,797,066 A | * | 8/1998 | Kishigami et al. | 399/51 |
| 6,301,022 B1 | * | 10/2001 | Washio et al. | 358/488 |
| 6,760,132 B1 | * | 7/2004 | Shibata | 358/488 |
| 7,355,764 B2 | * | 4/2008 | Ooshima et al. | 358/488 |
| 7,457,009 B2 | * | 11/2008 | Oyama et al. | 358/483 |
| 7,558,524 B2 | * | 7/2009 | Ooshima et al. | 399/370 |
| 7,719,726 B2 | * | 5/2010 | Kamei et al. | 358/463 |
| 7,782,498 B2 | * | 8/2010 | Hoshi | 358/474 |
| 7,969,622 B2 | * | 6/2011 | Saika | 358/475 |
| 8,115,975 B2 | * | 2/2012 | Shinkawa | 358/474 |
| 2005/0191100 A1 | * | 9/2005 | Ooshima et al. | 399/370 |
| 2008/0123163 A1 | * | 5/2008 | Nakano et al. | 358/498 |

FOREIGN PATENT DOCUMENTS

| | | |
|---|---|---|
| JP | 11-196235 | 7/1999 |
| JP | 2005-195785 | 7/2005 |
| JP | 2006-254182 | 9/2006 |

* cited by examiner

*Primary Examiner* — Negussie Worku
(74) *Attorney, Agent, or Firm* — Harness, Dickey & Pierce, P.L.C.

(57) ABSTRACT

A disclosed image scanning device includes a document table; a document pressing unit configured to press a document placed on the document table; a scanning unit including a light source for illuminating the document and configured to optically scan the document; a photoelectric conversion element; an open/close detection unit configured to detect opening and closing of the document pressing unit; and a control unit configured to turn on the light source of the scanning unit and thereby to cause the photoelectric conversion element to detect a size of the document if the closing of the document pressing unit is detected by the open/close detection unit or if a scanning start signal is detected. The control unit is configured to turn on the light source after a lighting delay period from a time when the closing of the document pressing unit is detected. The lighting delay period is changeable.

7 Claims, 12 Drawing Sheets

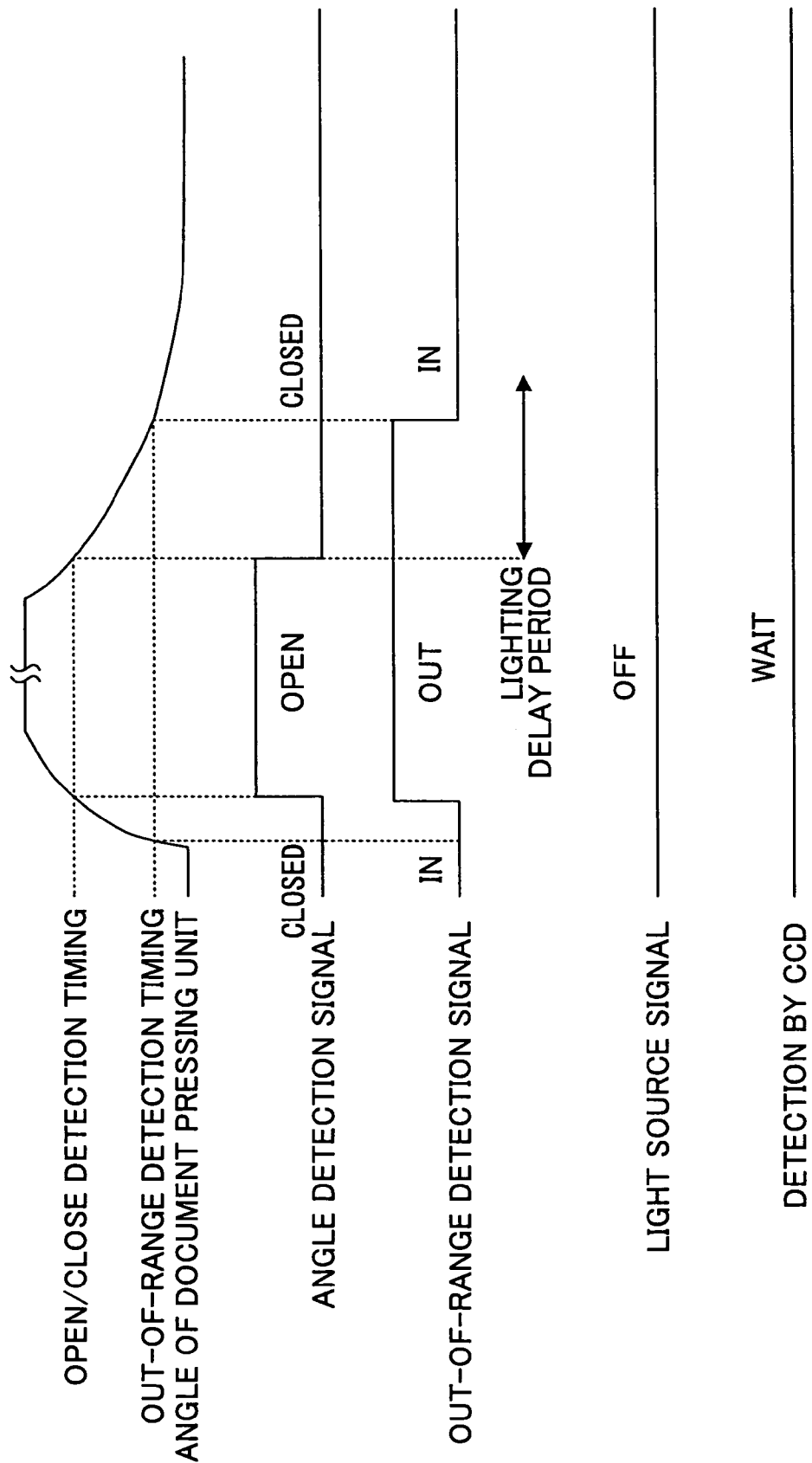

IMAGE SCANNING DEVICE AND IMAGE FORMING APPARATUS INCLUDING THE SAME

BACKGROUND OF THE INVENTION

1. Field of the Invention

A certain aspect of the present invention relates to an image scanning device and an image forming apparatus including the image scanning device.

2. Description of the Related Art

In a typical optical image scanning device, a document placed on a contact glass used as a document table is illuminated and light reflected from the document is detected by a CCD image sensor.

Normally, scanning parameters such as a linear scanning speed and a scanning distance are determined based on settings such as a document size, a resize ratio, and a scan density. Those settings are preferably performed automatically by the image scanning device rather than manually by the user (hereafter, "user" indicates all people who operate a device including an operator and a serviceperson) to improve user convenience and to prevent setting errors.

For example, patent document 1 discloses a method for automatically detecting a document size. In the disclosed method, the size in the main-scanning direction of a document is determined based on image data obtained by a CCD image sensor and the size in the sub-scanning direction is determined based on an output from a document detection sensor.

Patent document 2 also discloses a method for automatically detecting a document size where a scanning unit is placed in a position outside of an image scanning area while on standby, and is moved to a second position in the image scanning area to detect a document size when opening of a document pressing unit is detected.

Normally, a document detection sensor for detecting whether a document is present on a contact glass is used as a document size sensor for detecting a document size in the sub-scanning direction. If closing of a document pressing unit is detected when the document pressing unit is close to the contact glass, i.e., in the detection range of the document size sensor, the document size sensor may mistakenly detect the document pressing unit as a document even if no document is placed on the contact glass. To prevent this problem, in the disclosed method described above, an open/close detection unit is provided and configured to detect closing of the document pressing unit while the document pressing unit is at an angle with the contact glass that is large enough to prevent the document size sensor from mistakenly detecting the document pressing unit as a document. With this configuration, however, the light source is turned on while the document pressing unit is at a large angle and the light from the light source may enter the eyes of the user. Such light from the light source may damage the eyes of the user and at least causes the user to feel uncomfortable.

Thus, contrary to the above solution, the open/close detection unit must be configured to detect closing of the document pressing unit when the document pressing unit is at a low angle to prevent the light from entering the eyes of the user. Although the two conflicting problems may be solved by using a high-performance document detection sensor, this approach increases the production costs of an image scanning device.

Meanwhile, patent document 3 discloses an image scanning device where a light source is turned on as soon as an open/close sensor detects closing of a platen cover, but the intensity of light from the light source is set at a low level while the platen cover is being closed. This configuration, however, increases the costs of a lamp inverter.

[Patent document 1] Japanese Patent Application Publication No. 2006-254182

[Patent document 2] Japanese Patent Application Publication No. 11-196235

[Patent document 3] Japanese Patent Application Publication No. 2005-195785

SUMMARY OF THE INVENTION

Aspects of the present invention provide an image scanning device and an image forming apparatus including the image scanning device that solve or reduce one or more problems caused by the limitations and disadvantages of the related art.

According to an aspect of the present invention, an image scanning device includes a document table; a document pressing unit configured to press a document placed on the document table; a scanning unit including a light source for illuminating the document and configured to optically scan the document; a photoelectric conversion element; an open/close detection unit configured to detect opening and closing of the document pressing unit; and a control unit configured to turn on the light source of the scanning unit and thereby to cause the photoelectric conversion element to detect a size of the document if the closing of the document pressing unit is detected by the open/close detection unit or if a scanning start signal is detected. The control unit is configured to turn on the light source after a lighting delay period from a time when the closing of the document pressing unit is detected. The lighting delay period is changeable.

BRIEF DESCRIPTION OF THE DRAWINGS

FIG. 11 is another timing chart used to describe the third embodiment of the present invention.

DESCRIPTION OF THE PREFERRED EMBODIMENTS

Preferred embodiments of the present invention are described below with reference to the accompanying drawings.

<First Embodiment>

Figure 1A:
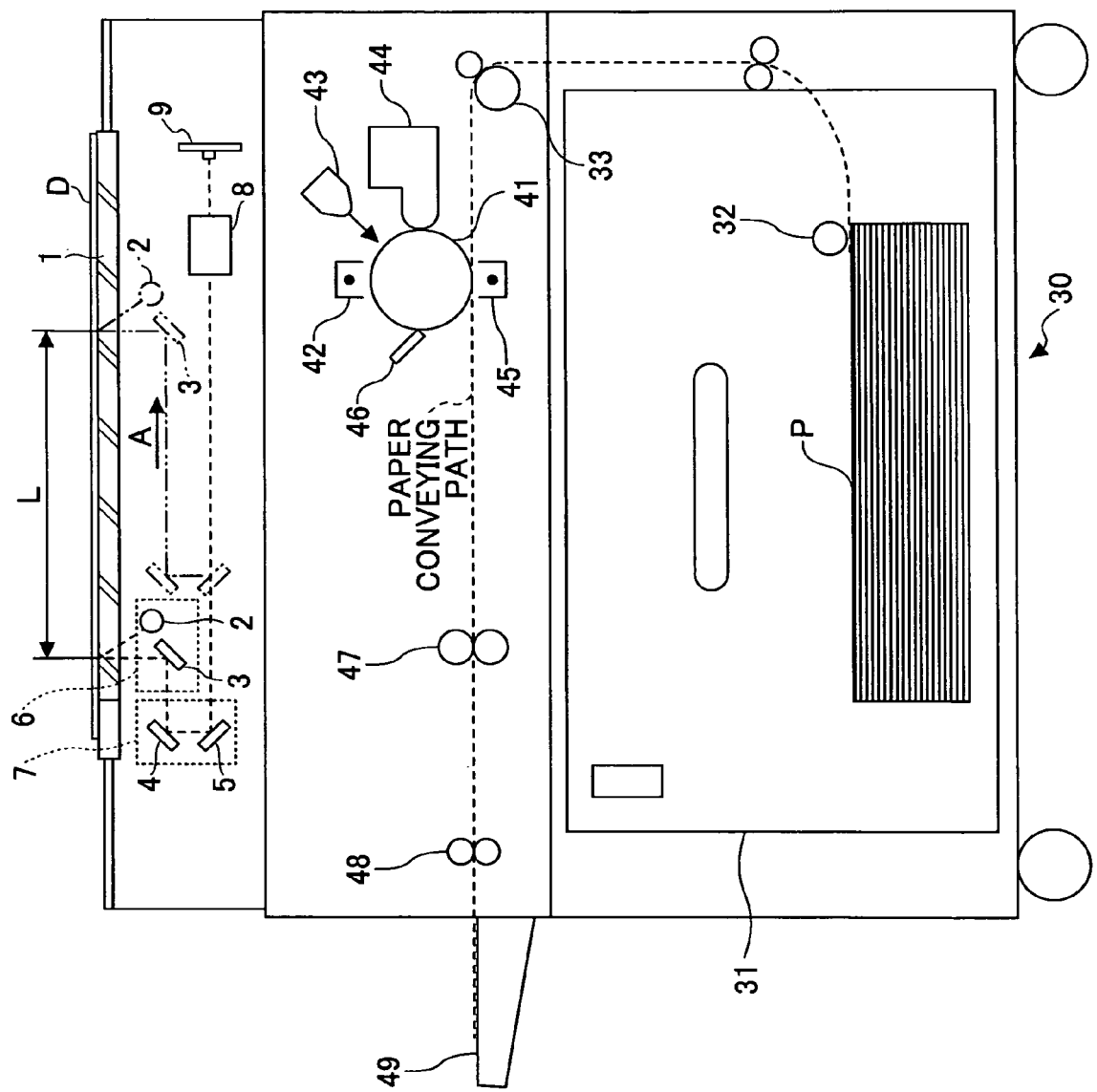
FIG. 1A is a schematic diagram illustrating an image forming apparatus including an image scanning device according to a first embodiment of the present invention.
Figure 1B:
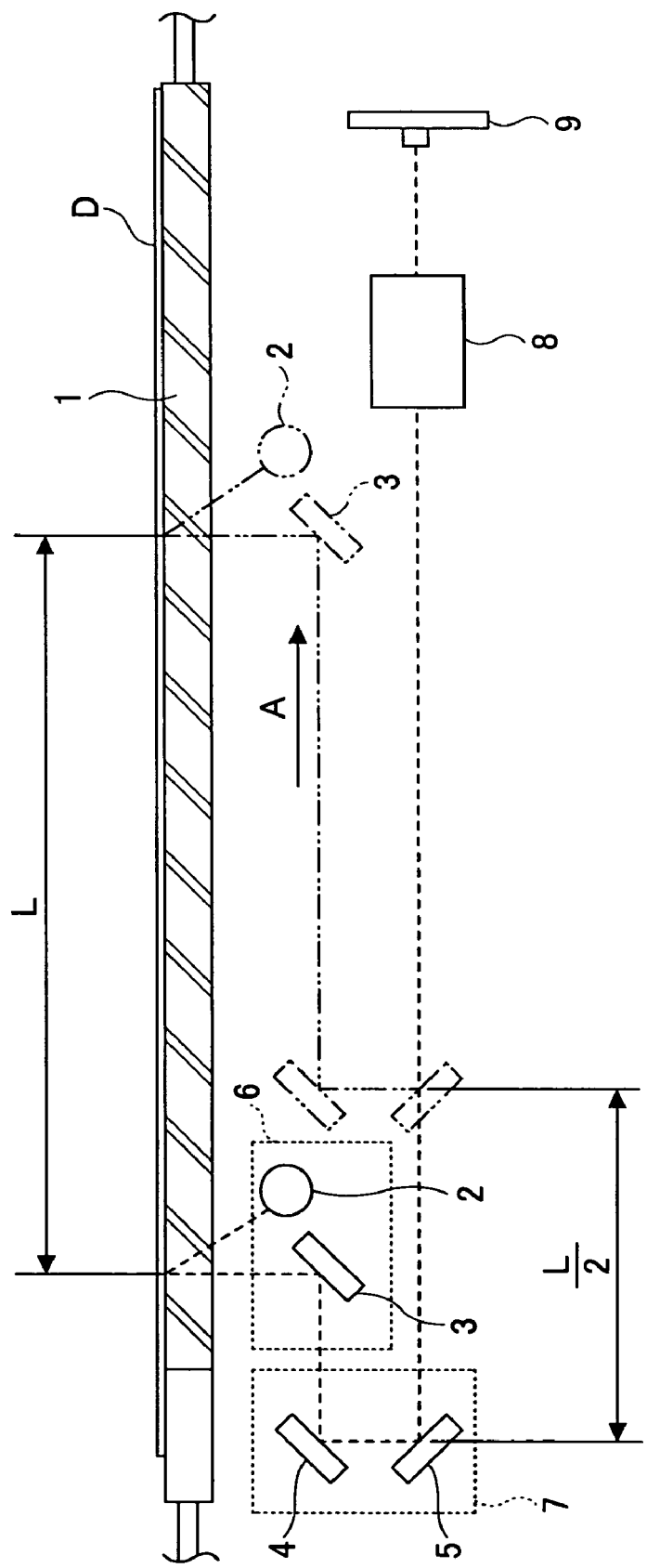
FIG. 1B is a schematic diagram illustrating the image scanning device shown in FIG. 1A.

FIG. 1A is a schematic diagram illustrating an image forming apparatus 30 including an image scanning device according to a first embodiment of the present invention. FIG. 1B is a schematic diagram illustrating the image scanning device shown in FIG. 1A. As shown in FIGS. 1A and 1B, the image scanning device of the image forming apparatus 30 includes a contact glass 1 used as a translucent or transparent document table; a first carriage 6 including a lamp 2 used as a light source and a first mirror 3; a second carriage 7 including a second mirror 4 and a third mirror 5; a lens 8; and a charge-coupled device (CCD) 9 (an example of a photoelectric conversion element). Those components of the image scanning device form an optical system for optically scanning a document.

The image forming apparatus 30 includes a paper-feed tray 31 for holding paper sheets (or any other types of recording media) and a paper-separating unit 32 (in this example, a paper-feed roller) for separating and feeding the paper sheets in the paper-feed tray 31 one by one. The image forming apparatus 30 also includes an image forming unit disposed above the paper-feed tray 31 and configured to form an image on a paper sheet. The image forming unit includes an image carrier 41, a charging unit 42, a latent image forming unit 43, a developing unit 44, a transfer unit 45, and a cleaning unit 46. A fusing unit 47 disposed downstream of the image forming unit in a paper conveying path fuses a toner image formed by the image forming unit onto a paper sheet by, for example, heat. The fusing unit 47 may be implemented by any related-art fusing device. Paper-eject rollers 48 are provided downstream of the fusing unit 47 in the paper conveying path to eject the paper sheet passing through the fusing unit 47 onto a paper catch tray 49.

Exemplary operations of the image forming apparatus 30 shown in FIGS. 1A and 1B are described below. The lamp 2 illuminates a document D placed on the contact glass 1. The light reflected from the document D is guided by the first mirror 3, the second mirror 4, and the third mirror 5 to the lens 8. Then, the lens 8 focuses the light onto the CCD 9. The image scanning device of the image forming apparatus 30 is configured such that the lamp 2 and the first mirror 3 move a distance L while the second mirror 4 and the third mirror 5 move a distance L/2. This configuration makes it possible to scan the entire document while keeping constant the optical path length of the optical system.

When a paper sheet is fed from the paper-feed tray 31 by the paper-separating unit 32, resist rollers 33 feed the paper sheet at a given timing into the image forming unit. After an image is formed by the image forming unit, the paper sheet goes through the fusing unit 47 and is ejected by the paper-eject rollers 48 onto the paper-catch tray 49.

Figure 2:
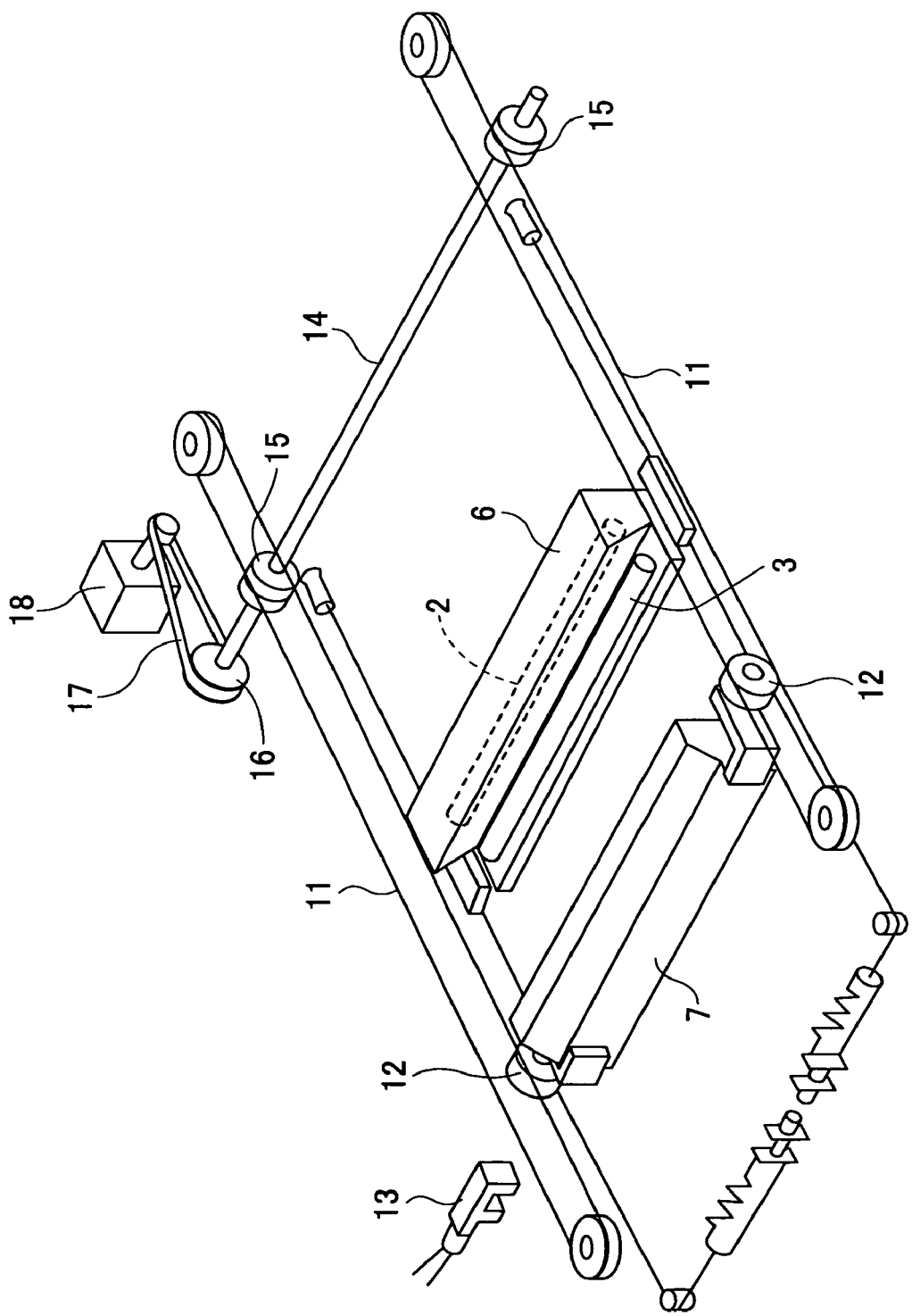
FIG. 2 is a perspective view of a drive mechanism of the image scanning device shown in FIGS. 1A and 1B.

FIG. 2 is a perspective view of a drive mechanism of the image scanning device shown in FIG. 1. As shown in FIG. 2, the first carriage 6 including the lamp 2 and the first mirror 3 is attached to drive wires 11, and the second carriage 7 including the second mirror 4 and the third mirror 5 is connected to pulleys 12 around which the drive wires 11 are wound. The drive wires 11 are also wound around wire pulleys 15 connected to a drive shaft 14. Torque generated by a drive motor 18 is transmitted via a timing belt 17 and a timing pulley 16 to the drive shaft 14.

The first carriage 6 is moved a distance further after its one end passes by a home position sensor 13 and is thereby placed in a home position.

The first carriage 6 and the second carriage 7 collectively function as a scanning unit for scanning a document and detecting a document size.

Figure 3:
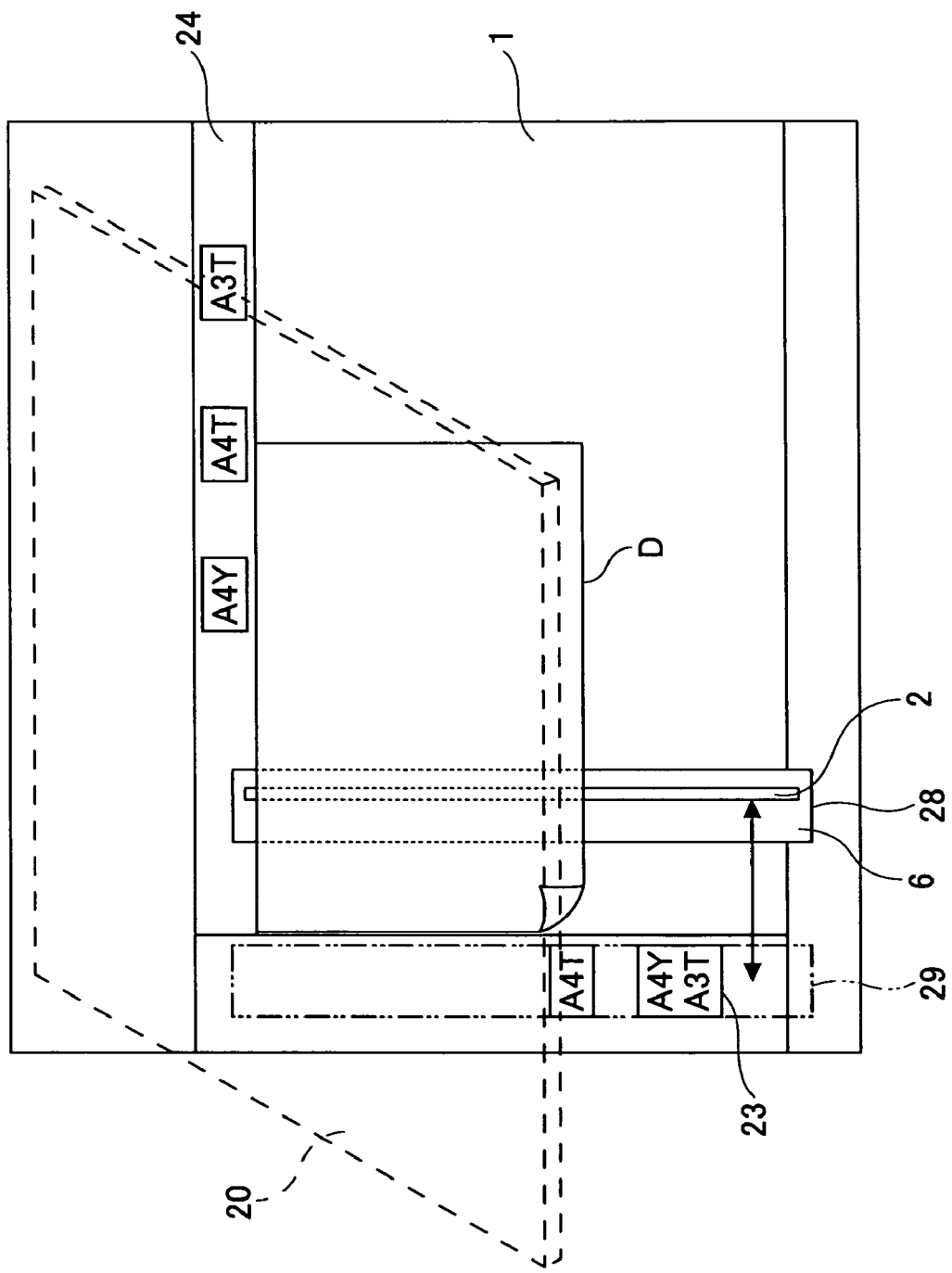
FIG. 3 is a plan view of an image scanning device.
Figure 4:
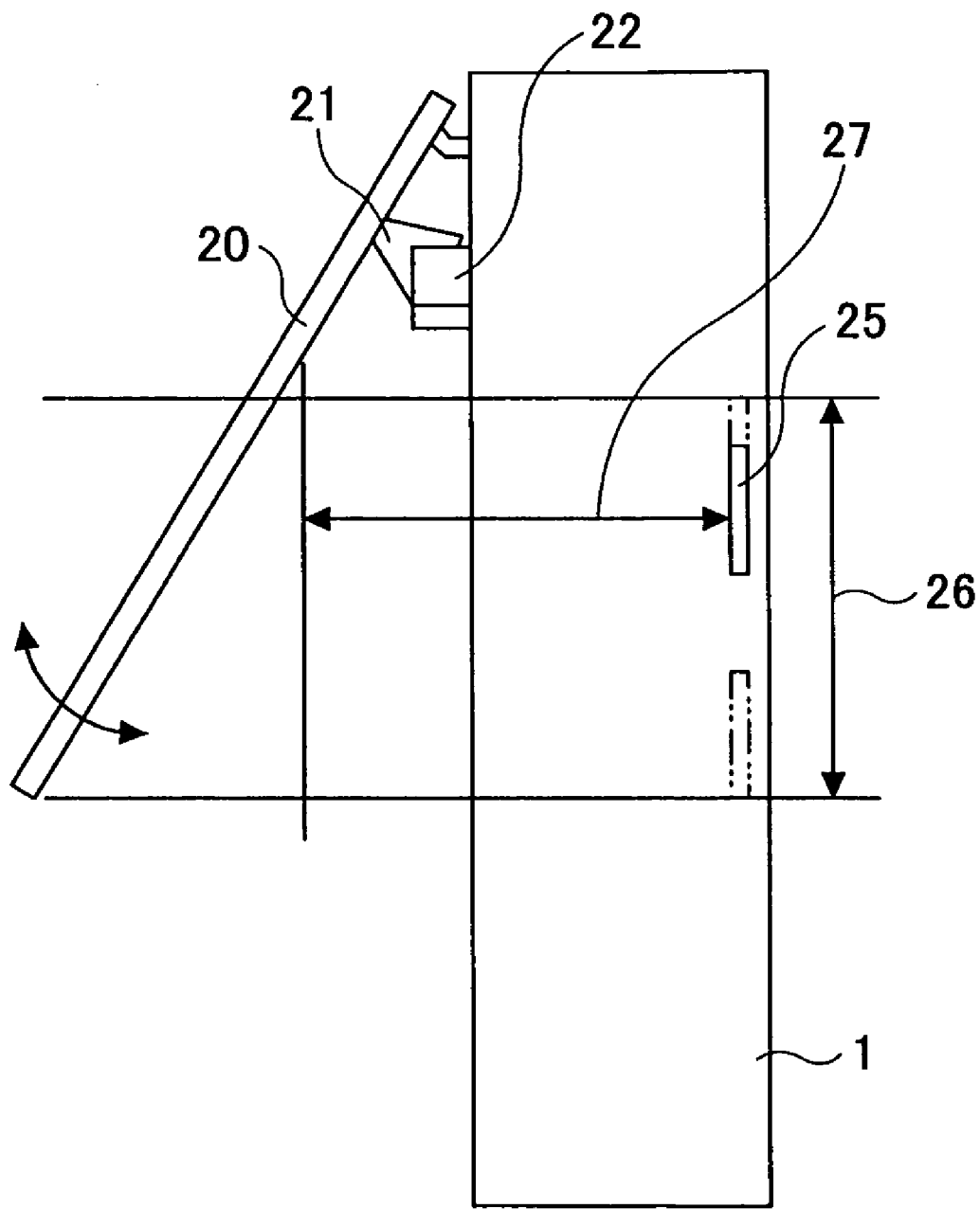
FIG. 4 is a side view of the image scanning device shown in FIG. 3.

FIG. 3 is a plan view of the image scanning device of this embodiment, and FIG. 4 is a side view of the image scanning device shown in FIG. 3. As shown in FIGS. 3 and 4, the image scanning device of this embodiment also includes a document pressing unit 20 for pressing the document D against the contact glass 1, a filler 21 that moves along with the document pressing unit 20, and a photo interrupter sensor 22 for detecting the filler 21. The filler 21 and the photo interrupter sensor 22 collectively function as an open/close detection unit for detecting opening and closing of the document pressing unit 20. The document pressing unit 20 is composed of parts that do not allow light to pass through. In this embodiment, if the filler 21 is inserted into and detected by the photo interrupter sensor 22, it is determined that the document pressing unit 20 is being closed to cover the upper surface of the contact glass 1.

The image scanning device of this embodiment further includes document size scales 23 and 24 that indicate predefined sizes of documents and a document size sensor 25 for detecting the size in the sub-scanning direction of a document. In FIGS. 3 and 4, 26 indicates a sensor installation range within which the document size sensor 25 is installed (so that the document pressing unit 20 is located above the document size sensor 25), 27 indicates a document detection range of the document size sensor 25 (out of which, the document size sensor 25 cannot detect the document pressing unit 20), 28 indicates a document size detection position of the first carriage 6, and 29 indicates a document scanning wait position (home position) of the first carriage 6.

Figure 5:
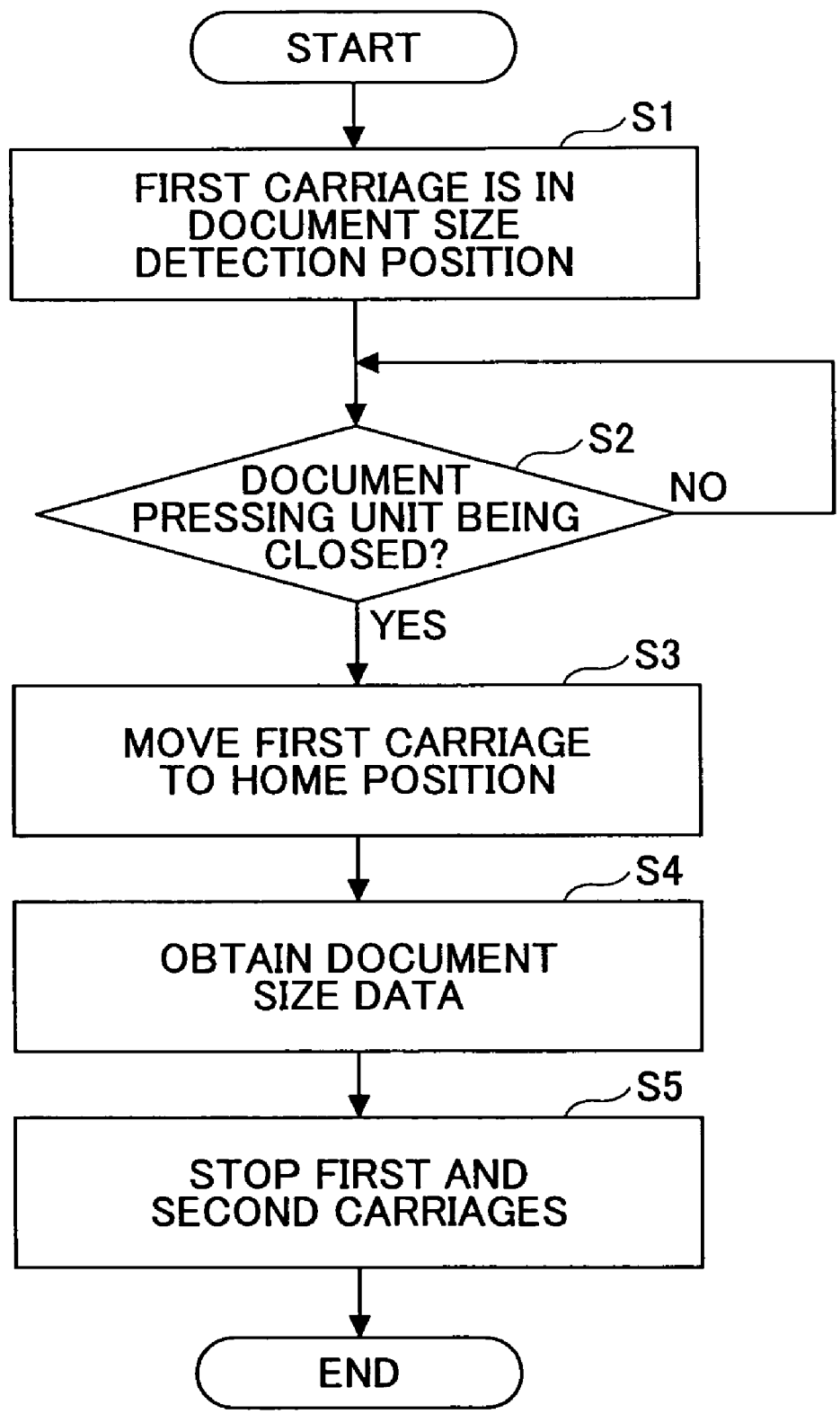
FIG. 5 is a flowchart showing a basic document size detection process.

A basic document size detection process of this embodiment is described below with reference to FIG. 5. The document size detection process described below is controlled (performed) by a control unit (not shown) implemented by a CPU of the image scanning device or the image forming apparatus 30. If the open/close detection unit (the filler 21 and the photo interrupter sensor 22) detects that the document pressing unit 20 is being closed (S2) while the first carriage 6 is in the document size detection position 28 (S1), the control unit turns on the lamp 2 of the first carriage 6 and moves the first carriage 6 from the document size detection position 28 to the document scanning wait position 29 (home position) (S3). Then, the control unit causes the first carriage 6 in conjunction with the second carriage 7 to scan the document D multiple times in the sub-scanning direction to obtain document size data in the main-scanning direction (S4). After obtaining the document size data in the main-scanning direction, the control unit stops the first and second carriages 6 and 7 (S5). The document size may be detected (or the document size data may be obtained) either while the first and second carriages 6 and 7 are moving or while they are stationary.

The document size data may be either continuous data or a collection of partial data sets. Scanning a document multiple times makes it possible to improve the accuracy in detecting the document size. The presence of a document is determined, for example, by comparing the luminance of respective dots in the document size data with a threshold. If the luminance of a dot is greater than the threshold, it indicates that a document is present at the corresponding position.

Also when the open/close detection unit detects that the document pressing unit 20 is being closed, the control unit obtains document size data in the sub-scanning direction. Then, the control unit determines a document size (dimensions) based on the document size data in the main-scanning direction and the document size data in the sub-scanning direction.

In this embodiment, as described above, the document size sensor 25 is used to detect a document size in the sub-scanning direction. If a light source such as a fluorescent lamp emitting disturbing light is present above the document size sensor 25, the disturbing light may affect the detection result of the document size sensor 25. Therefore, it is preferable to adjust the positions of the filler 21 and the photo interrupter sensor 22 such that the filler 21 enters the photo interrupter sensor 22 after the document pressing unit 20 reaches an angle at which the document pressing unit 20 can shield the document size sensor 25 from the disturbing light.

The document size sensor 25 also detects whether a document is present on the contact glass 1. If closing of the document pressing unit 20 is detected when the document pressing unit 20 is close to the contact glass 1, i.e., in the detection range of the document size sensor 25, the document size sensor 25 may mistakenly detect the document pressing unit 20 as a document even if no document is placed on the contact glass 1. To prevent or minimize this problem, it is preferable to adjust the positions of the filler 21 and the photo interrupter sensor 22 such that the filler 21 enters the photo interrupter sensor 22 while the document pressing unit 20 is still outside of the detection range of the document size sensor 25. This also applies to a process of detecting a document size with the CCD 9. If closing of the document pressing unit 20 is detected when the document pressing unit 20 is too close to the contact glass 1, the CCD 9 may mistakenly detect the document pressing unit 20 as a document.

Figure 6:
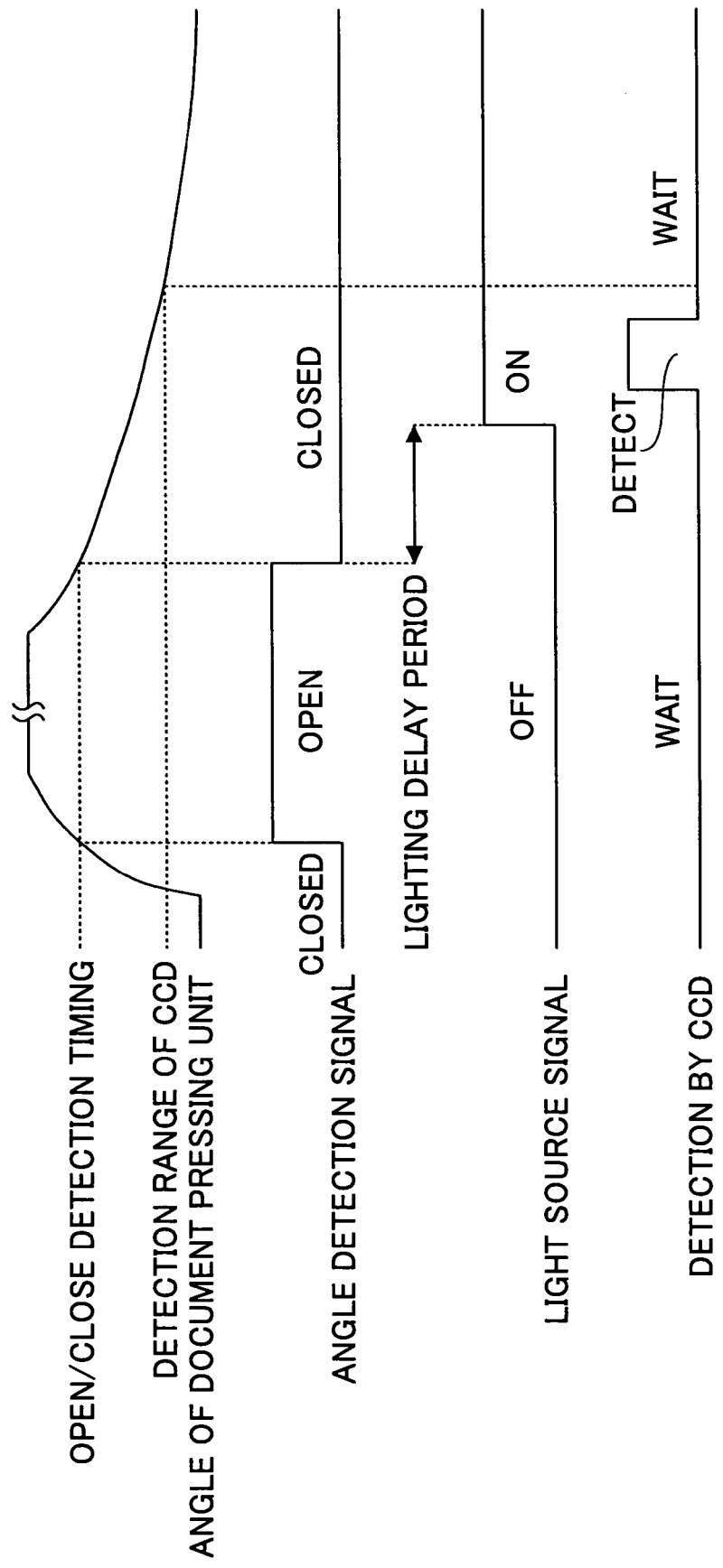
FIG. 6 is a timing chart showing a document size detection timing according to a first embodiment of the present invention.

FIG. 6 is a timing chart showing a document size detection timing according to the first embodiment of the present invention. In the timing chart, the document pressing unit 20 is opened, a document is placed by a user, and then the document pressing unit 20 is closed. A document size can be detected during a period (detectable period) from when the light source (lamp 2) is turned on to when the document pressing unit 20 enters the detection range of the CCD 9. In this embodiment, as shown in FIG. 6, the light source is turned on (the light source signal turns on) after a lighting delay period from a time when closing of the document pressing unit 20 is detected (close detection timing). Providing the lighting delay period makes it possible to turn on the lamp 2 after the document pressing unit 20 reaches an angle that is small enough to reduce the amount of light entering the eyes of the user.

Figure 7:
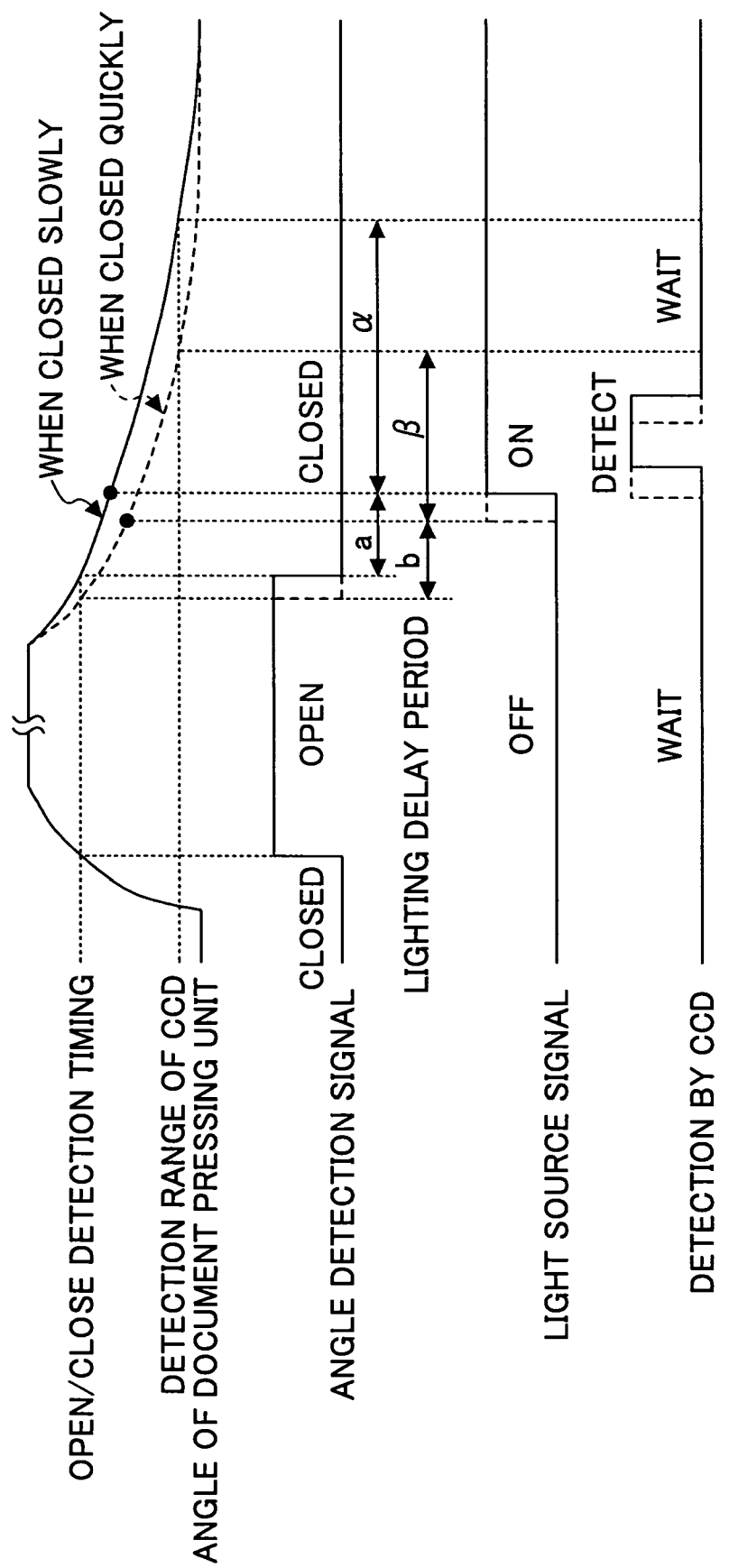
FIG. 7 is a timing chart showing document size detection timings in cases where the user closes a document pressing unit at different speeds.
Figure 8:
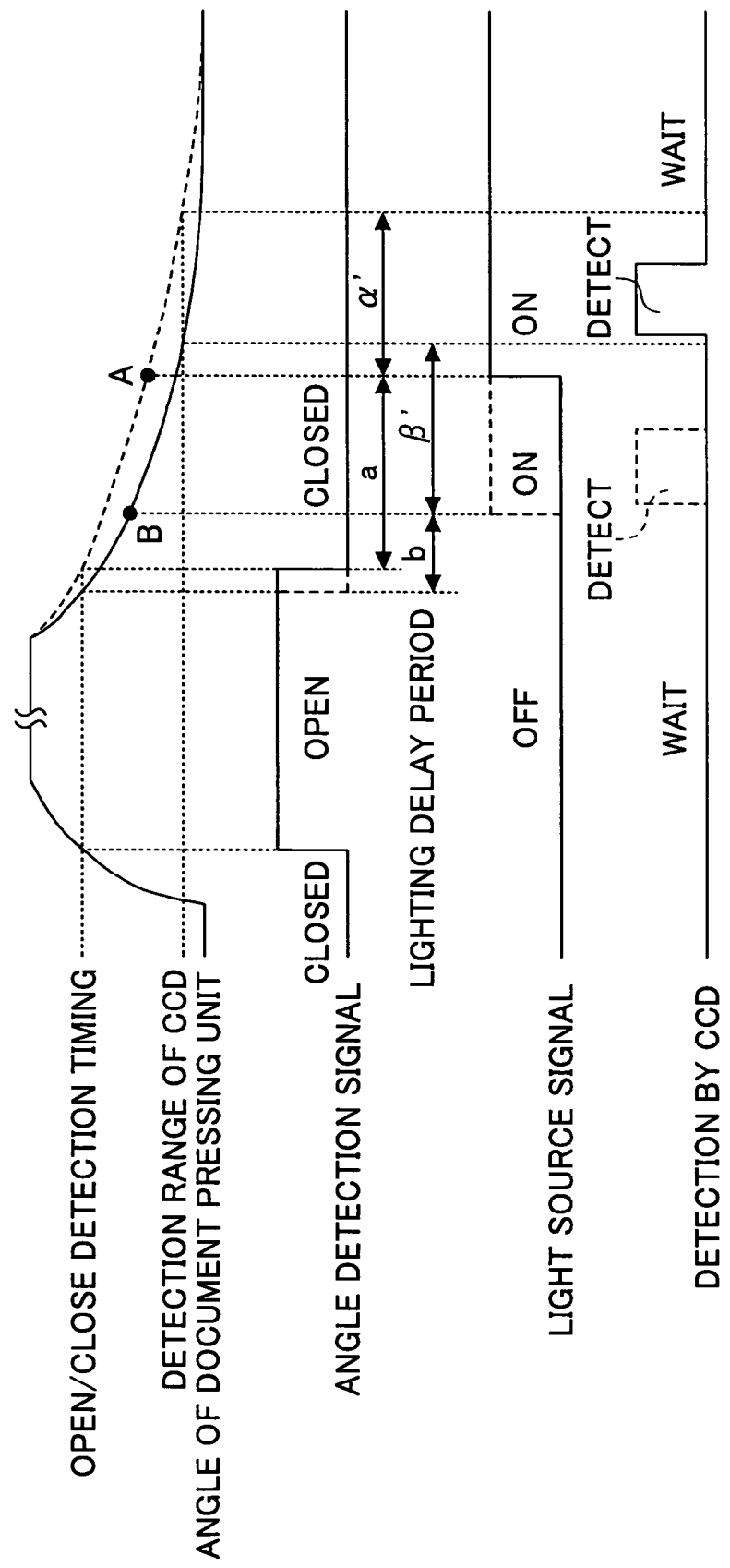
FIG. 8 is a timing chart showing document size detection timings in cases where different lighting delay periods are used.

Meanwhile, as shown in FIG. 7, the speed of closing the document pressing unit 20 varies depending on the user. In a case where the user closes the document pressing unit 20 slowly, if the lighting delay period of the light source (lamp 2) is short, i.e., if lighting delay periods "a" and "b" in FIG. 7 are the same, the light source is turned on when the angle of the document pressing unit 20 is still large. In FIG. 7, a solid line indicates the angle of the document pressing unit 20 being closed slowly, a dotted line indicates the angle of the document pressing unit 20 being closed quickly, and black dots on the respective lines indicate timings when the light source is turned on. The black dot on the solid line (when the document pressing unit 20 is closed slowly) is above the black dot on the dotted line (when the document pressing unit 20 is closed quickly). This indicates that at a timing when the light source is turned on, the angle of the document pressing unit 20 being closed slowly is larger than the angle of the document pressing unit 20 being closed quickly. Assuming that the light from the light source enters the eyes of the user until the document pressing unit 20 enters the detection range of the CCD 9, an incident duration a (during which the light enters the eyes of the user) when the document pressing unit 20 is closed slowly becomes longer than an incident duration 3 when the document pressing unit 20 is closed quickly. In this embodiment, to cope with this problem, the lighting delay period can be changed depending on the user (or the speed of closing the document pressing unit 20). In the example shown in FIG. 8, a lighting delay period "a" for a user who closes the document pressing unit 20 slowly is made longer than a lighting delay period "b" for a user who closes the document pressing unit 20 quickly. With this configuration, contrary to FIG. 7, the angle of the document pressing unit 20 being closed quickly is larger than the angle of the document pressing unit 20 being closed slowly when the light source is turned on. Thus, this configuration makes it possible to make incident durations α' and β' for the respective users substantially the same. The lighting delay period may be changed, for example, by switching operational modes using an operations unit (not shown) of the image scanning device or the image forming apparatus 30.

<Second Embodiment>

Figure 9:
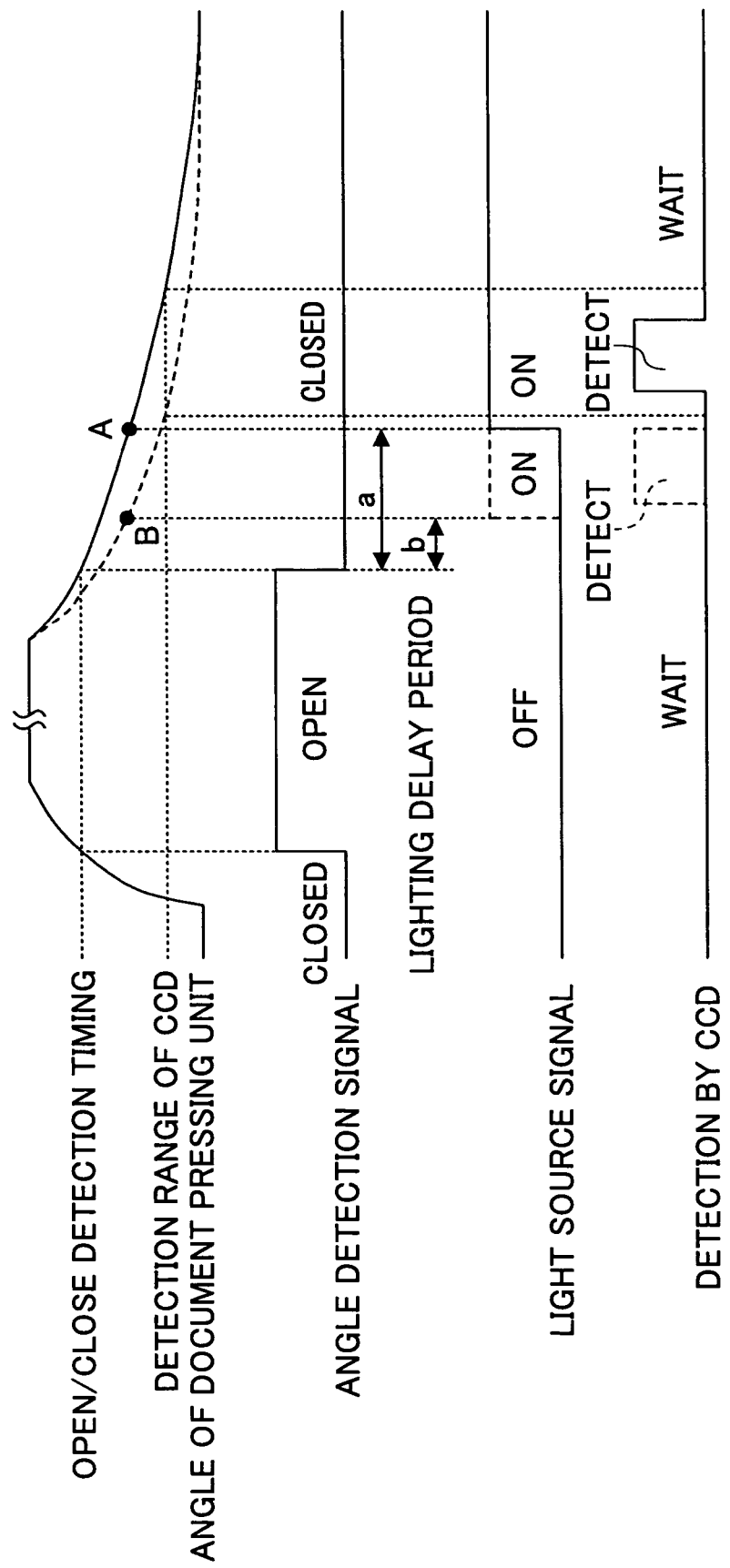
FIG. 9 is a timing chart used to describe a second embodiment of the present invention.

A second embodiment of the present invention is described below with reference to FIG. 9.

There are many types of document pressing units used for an image scanning device. Examples of document pressing units include an automatic document feeder (ADF), an automatic reversing document feeder (ARDF), and a pressing plate. FIG. 9 shows angles of two types of document pressing units A and B and close detection timings when closing of the document pressing units A and B are detected. As shown in FIG. 9, if the weights and sizes of the document pressing units A and B are different, the close detection timings of the document pressing units A and B may vary even if they are operated by the same user. In this embodiment, to accommodate the difference in the close detection timings, plural lighting delay periods are predetermined for different types of document pressing units. In the example shown in FIG. 9, a lighting delay period "a" is applied to the document pressing unit A and a lighting delay period "b" is applied to the document pressing unit B. This configuration makes it possible to make the angles of different types of document pressing units substantially the same when the light source (lamp 2) is turned on. For example, each type of document pressing unit is associated with a lighting delay period and is selected using the operations unit of the image scanning device or the image forming apparatus 30. Still in this case, the lighting delay period for each type of document pressing unit is preferably changeable.

Instead of changing the lighting delay period by manually selecting a document pressing unit as described above, it is also possible to configure the control unit of the image scanning device or the image forming apparatus 30 to automatically detect the type of document pressing unit by, for example, communicating with the document pressing unit via a connector and to select a lighting delay period suitable for the detected type of document pressing unit. Still in this case, the lighting delay period for each type of document pressing unit is preferably changeable.

Meanwhile, in a case where a pressing plate having no electric connector and a document feeder having an electric connector are used as document pressing units for the image scanning device, the control unit may not be able to detect the type of the pressing plate. In such a case, the control unit may be configured to use a default value (default lighting delay period) as the lighting delay period for the pressing plate, and to automatically detect the document feeder and select a suitable lighting delay period for the document feeder.

In the above embodiments, a document size detection process is initiated when the open/close detection unit detects closing of the document pressing unit 20. However, there is a case where a document is processed (e.g., copied) with the document pressing unit 20 open. In this case, since light from the light source enters the eyes of the user regardless of the length of the lighting delay period, it is preferable to set the lighting delay period as short as possible to reduce the first copy time. For example, if a copy start button is pressed or a scanning start signal is detected while the document pressing unit is open, the lighting delay period may be set at zero seconds regardless of the currently selected lighting delay period.

<Third Embodiment>

A third embodiment of the present invention is described below with reference to FIGS. 10 and 11.

Figure 10:
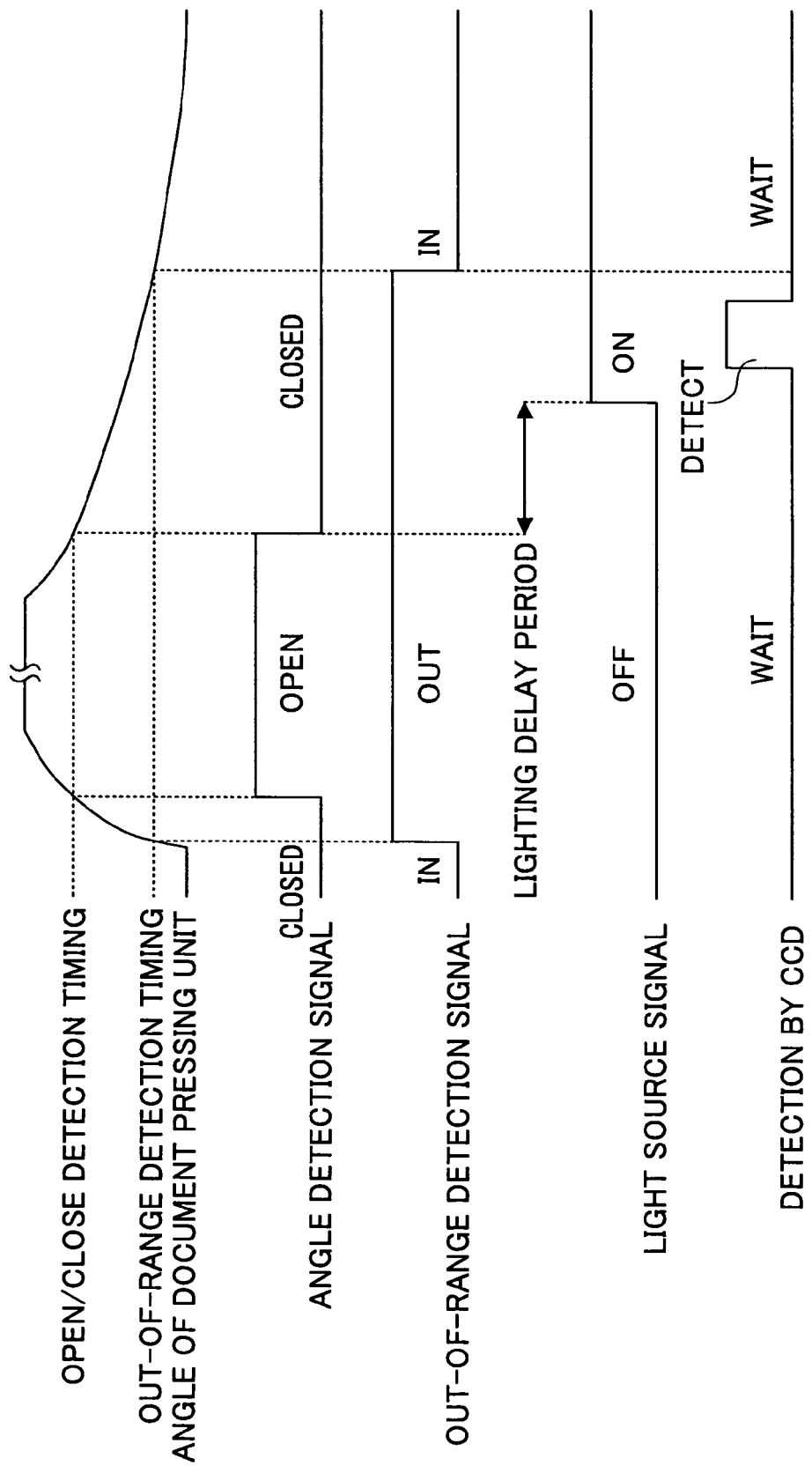
FIG. 10 is a timing chart used to describe a third embodiment of the present invention.

FIG. 10 is a timing chart used to describe a case where an out-of-range detection unit for detecting whether the document pressing unit 20 is in the detection range of the CCD 9 is provided in the image scanning device. FIG. 11 is a timing chart used to describe a case where the document pressing unit 20 enters the detection range of the CCD 9 during the lighting delay period (i.e., the out-of-range detection unit detects that the document pressing unit 20 has entered the detection range during the lighting delay period). As described above, after the document pressing unit 20 enters the detection range of the CCD 9, the CCD 9 may not be able to correctly detect the size of a document. Therefore, in this embodiment, the control unit does not detect the size of a document if the out-of-range detection unit detects that the document pressing unit 20 has entered the detection range during the lighting delay period (i.e., before the light source is turned on). Also in this case, the control unit is preferably configured not to turn on the light source.

The image scanning device of this embodiment may also include a reporting unit for reporting to the operator that the document size has not been detected. For example, the reporting unit may be implemented by a liquid crystal display of the operations unit of the image scanning device or the image forming apparatus 30, and the control unit may be configured to display a message such as "Document size is unknown" on the liquid crystal display. Alternatively, the reporting unit may be implemented by a lamp made of, for example, an LED and the control unit may be configured to turn on or off the lamp depending on whether the document size has been detected. Also, any other known method may be used to report that the document size has not been detected.

As described above, an image scanning device according to an embodiment of the present invention makes it possible to change the lighting delay period depending on the speed of closing a document pressing unit and thereby makes it possible to reduce the amount of light entering the eyes of the user regardless of the speed of closing the document pressing unit. Changing the lighting delay period also makes it possible to accommodate mechanical variations (e.g., mounting positions of the filler 21 and the photo interrupter sensor 22) of the image scanning device. Thus, the above configuration makes it possible to reduce the amount of light entering the eyes of the user without using an expensive high-performance document detection sensor, i.e., without increasing the production costs of an image scanning device.

According to another embodiment of the present invention, a suitable lighting delay period can be selected for each type of document pressing unit. This configuration makes it possible to reduce the amount of light entering the eyes of the user even if different types of document pressing units are used. Also, this configuration makes it possible to detect a document size at an appropriate timing according to the mounting position and shape of the filler of the document pressing unit. Selection of a lighting delay period suitable for a document pressing unit can be done manually by the user or automatically by the control unit of the image scanning device. Even if a document pressing unit that is not automatically detectable is used, the control unit may apply a default lighting delay period to the document pressing unit.

The image scanning device may be configured to use a short lighting delay period (or no lighting delay period) regardless of the type of document pressing unit and/or the currently selected lighting delay period if a document is to be processed with the document pressing unit open. According to still another embodiment of the present invention, the image scanning device further includes an out-of-range detection unit for detecting whether the document pressing unit is in the detection range of a CCD (photoelectric conversion element). If the out-of-range detection unit detects that the document pressing unit has entered the detection range during the lighting delay period, the control unit does not perform the document size detection process. In this case, for example, the control unit requests the operator via a reporting unit to manually set a document size or to open and close the document pressing unit again. Also in this case, the control unit may be configured not to turn on the light source to save energy.

The present invention is not limited to the specifically disclosed embodiments, and variations and modifications may be made without departing from the scope of the present invention.

The present application is based on Japanese Priority Application No. 2008-167549 filed on Jun. 26, 2008 and Japanese Priority Application No. 2009-009110 filed on Jan. 19, 2009, the entire contents of which are hereby incorporated herein by reference.

What is claimed is:

1. An image scanning device, comprising:
   a document table;
   a document pressing unit configured to press a document placed on the document table;
   a scanning unit including a light source for illuminating the document and configured to optically scan the document;
   a photoelectric conversion element;
   an open/close detection unit configured to detect opening and closing of the document pressing unit; and
   a control unit configured to turn on the light source of the scanning unit and thereby to cause the photoelectric conversion element to detect a size of the document if the closing of the document pressing unit is detected by the open/close detection unit or if a scanning start signal is detected,
   wherein the control unit is configured to turn on the light source after a lighting delay period from a time when the closing of the document pressing unit is detected, the lighting delay period being variable depending on an user.

2. The image scanning device as claimed in claim 1, wherein the lighting delay period is variable according to a type of the document pressing unit.

3. The image scanning device as claimed in claim 2, wherein the control unit is configured to automatically detect the type of the document pressing unit and to automatically change the lighting delay period according to the detected type of the document pressing unit.

4. The image scanning device as claimed in claim 3, wherein the control unit is configured to use a default value as the lighting delay period for the document pressing unit if the type of the document pressing unit is not automatically detectable.

5. The image scanning device as claimed in claim 1, wherein the control unit is configured to use different lighting delay periods for a case where the closing of the document pressing unit is detected by the open/close detection unit and a case where the scanning start signal is detected while the document pressing unit is open.

6. The image scanning device as claimed in claim 1, further comprising:
   an out-of-range detection unit configured to detect whether the document pressing unit is in a detection range of the photoelectric conversion element; and
   a reporting unit,
   wherein the control unit is configured
   to not detect the size of the document if the out-of-range detection unit detects that the document pressing unit has entered the detection range before the light source is turned on; and
   to cause the reporting unit to report to a user that the size of the document has not been detected.

7. An image forming apparatus comprising the image scanning device as claimed in claim 1.

* * * * *